US012571434B2

(12) United States Patent
Carpenter et al.

(10) Patent No.: US 12,571,434 B2
(45) Date of Patent: Mar. 10, 2026

(54) LINEAR BALL GUIDE ASSEMBLY FOR A LOCKING CLUTCH

(71) Applicant: JTEKT Bearings North America LLC, Greenville, SC (US)

(72) Inventors: Trent Carpenter, Anderson, SC (US); Anthony Bryant, Westminster, SC (US); Robert Lukasiewicz, Simpsonville, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 208 days.

(21) Appl. No.: 18/275,315

(22) PCT Filed: Feb. 7, 2022

(86) PCT No.: PCT/US2022/015489
§ 371 (c)(1),
(2) Date: Aug. 1, 2023

(87) PCT Pub. No.: WO2022/170189
PCT Pub. Date: Aug. 11, 2022

(65) Prior Publication Data
US 2024/0125360 A1     Apr. 18, 2024

Related U.S. Application Data

(60) Provisional application No. 63/146,205, filed on Feb. 5, 2021.

(51) Int. Cl.
*F16D 23/14*     (2006.01)
*F16C 29/04*     (2006.01)
(52) U.S. Cl.
CPC .............. *F16D 23/14* (2013.01); *F16C 29/04* (2013.01)

(58) Field of Classification Search
CPC ........ F16D 23/14; F16C 29/04; F16C 29/008; F16C 33/40; F16C 2361/43
See application file for complete search history.

(56) References Cited

U.S. PATENT DOCUMENTS

| | | | |
|---|---|---|---|
| 2,774,430 A | 12/1956 | Blazek | |
| 4,234,067 A * | 11/1980 | Billet ...................... | F16D 23/14 |
| | | | 192/99 A |

(Continued)

FOREIGN PATENT DOCUMENTS

| | | | |
|---|---|---|---|
| DE | 3743138 A1 | 9/1989 | |
| DE | 102010010734 A1 * | 9/2011 | ............. F16C 29/04 |

(Continued)

OTHER PUBLICATIONS

International Search Report and Written Opinion for International Application No. PCT/US2022/015489 mailed Jun. 2, 2022.

*Primary Examiner* — Richard M Lorence
(74) *Attorney, Agent, or Firm* — Nelson Mullins Riley & Scarborough LLP

(57)     ABSTRACT

A sliding assembly (100) for use in a clutch assembly having a housing, including a body portion, preferably in the form of a sliding ring (102) having a central bore (108) extending therethrough, a linear ball guide (130) including an elongated guide pin (132) affixed to the body portion (102), and including an annular groove (136), a detent housing (140) defining a central bore (144), the guide pin (132) extending through the central bore (144) of the detent housing (140) so that the bore (144) of the detent housing (140) and the outer surface (134) of the guide pin (132) defines an annular space therebetween, and a ball bearing assembly disposed in the annular space. The balls (166) are provided in an annular bearing cage (160). The detent housing (140) has a catch (Continued)

portion (150), which is selectively engageable with the annular groove (136) of the guide pin (132).

18 Claims, 4 Drawing Sheets

(56)                    References Cited

U.S. PATENT DOCUMENTS

| | | | |
|---|---|---|---|
| 4,895,235 | A | 1/1990 | Nishimura et al. |
| 5,653,323 | A | 8/1997 | Rappaport |
| 2020/0256410 | A1 | 8/2020 | Willey |
| 2022/0112924 | A1* | 4/2022 | Kluge .................. F16D 27/108 |

FOREIGN PATENT DOCUMENTS

| | | | |
|---|---|---|---|
| DE | 10041990 | A1 | 3/2022 |
| JP | S6073938 | U | 5/1985 |
| JP | 2001353728 | A | 12/2001 |
| KR | 20060064843 | A | 6/2006 |

* cited by examiner

LINEAR BALL GUIDE ASSEMBLY FOR A LOCKING CLUTCH

RELATED APPLICATIONS

This is a 35 U.S.C. § 371 national stage application of PCT/US2022/015489, filed Feb. 7, 2022, which claims priority to U.S. Provisional Patent Application No. 63/146, 205 filed Feb. 5, 2021, the entire disclosures of which are incorporated herein for all purposes.

FIELD OF THE INVENTION

The present invention relates generally to low-friction locking clutch assemblies and, more particularly, to linear bearing assemblies to facilitate the fore and after motion of the assemblies' annular sliding rings.

BACKGROUND OF THE INVENTION

The actuation of known non-friction clutch/brakes with the linear actuation force being applied off-axis to the clutch or brake's annular sliding ring, as shown in FIGS. 4A and 4B, poses a number of notable challenges. For example, sufficient axial length (L) of the clutch or brake's sliding ring 10 with regard to the support hub 30 is desirable to prevent binding as the sliding ring 10 travels along the support hub 30. However, it is also desirable to maintain shorter axial length (L) of the sliding ring 10 to reduce the overall size of the assembly, thereby reducing packaging, installation space, etc., as well as reducing operating frictional forces between the sliding ring 10 and the support hub 30. Another issue may arise due to the required small radial clearances (c) between the sliding ring 10 and the support hub 30 that help to reduce binding and maintain system alignment. Tolerances to maintain minimal clearance (c) create high manufacturing costs and challenges. Additionally, as the system functions best on low friction, and is sensitive to any change in friction between the sliding ring 10 and the support hub 30, premium surface finishes are required. Not only are premium surface finishes difficult to manufacture, but they typically change over the life of the product as wear occurs and debris accumulates.

Referring specifically to FIG. 4B, when the length (L) of the sliding ring 10 in the axial direction is too short, or the radial clearance (c) between the outer surface 32 of the support hub 30 and the inner surface 18 of the central bore 20 of the sliding ring 10 is too large, or both, known assemblies are prone to jamming and subsequent non-function based on the equation: $c \geq L/\mu - 2r$, where (F) is an applied force, (r) is the distance from the longitudinal center axis 11 that the force (F) is applied, and ($\mu N$) is friction due to the normal force (N). Therefore, as noted above, from a standpoint of preventing binding, it is desirable to increase (L) of the sliding ring 10, reduce (c) between the sliding ring 10 and support hub 30, and improve the surface finish of the support hub 30. These all lead to increased costs of manufacture as increasing (L) increases material usage and overall size of the assembly, reducing (c) requires closer tolerances and improved accuracy of production, and higher quality finishes require more sophisticated and time-consuming procedures.

The present invention recognizes and addresses considerations of prior art constructions and methods.

SUMMARY OF THE INVENTION

One embodiment in accordance with the present disclosure is a sliding ring assembly for use in a locking clutch assembly having a housing, including a sliding ring having a first end face, a second end face, a central bore extending therethrough from the first end face to the second end face and defining a first edge and a second edge at the intersection of the central bore and the first end face and the second end face, respectively, and a linear ball guide assembly including at least a first linear ball guide having an elongated guide pin including a first end affixed to the second end face of the sliding ring, an outer surface extending from the first end to the second end, and an outer surface defining an annular groove extending inwardly therefrom, a detent housing including a body portion having a first end and a second end, a central bore extending therethrough and a catch portion, the guide pin extending through the central bore of the detent housing so that the bore of the detent housing and the outer surface of the guide pin defines an annular space therebetween, an annular bearing assembly disposed in the annular space defined between the guide pin and the detent housing, wherein the catch portion is selectively engageable with the annular groove.

Another embodiment of the present disclosure is a sliding assembly for use in a locking clutch assembly having a housing, including a body portion having a first end face and a second end face, a linear ball guide assembly including at least a first linear ball guide having an elongated guide pin including a first end and a second end, the first end being affixed to the second end face of the body portion, and an outer surface extending from the first end to the second end, a detent housing including a body portion having a first end, a second end, and a central bore extending therethrough, the guide pin extending through the central bore of the detent housing so that the bore of the detent housing and the outer surface of the guide pin define an annular space therebetween, and an annular bearing assembly disposed in the annular space defined between the guide pin and the detent housing.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1B:
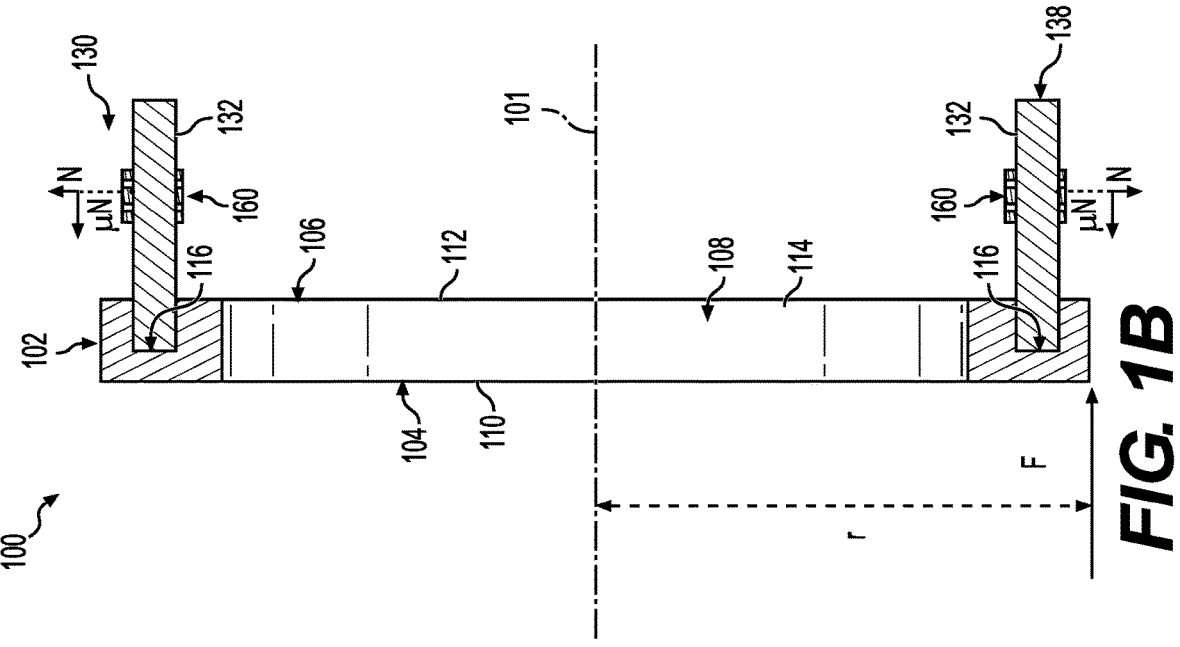
FIGS. 1A and 1B are a perspective view and a cross-sectional view of a locking clutch assembly including an annular sliding ring and linear bearings in accordance with an embodiment of the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the linear ball guide for a locking clutch assembly, such as but not limited to "vertical," "horizontal," "top," "bottom," "above," or "below," refer to directions and relative positions with respect to the linear ball guide for a locking clutch assembly's orientation shown in FIGS. 3A and 3B. Thus, for instance, the terms "vertical" and "top" refer to the vertical orientation and relative upper position in the perspective of FIGS. 3A and 3B, and should be understood in that context, even with respect to a linear ball guide for a locking clutch assembly that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 1A:
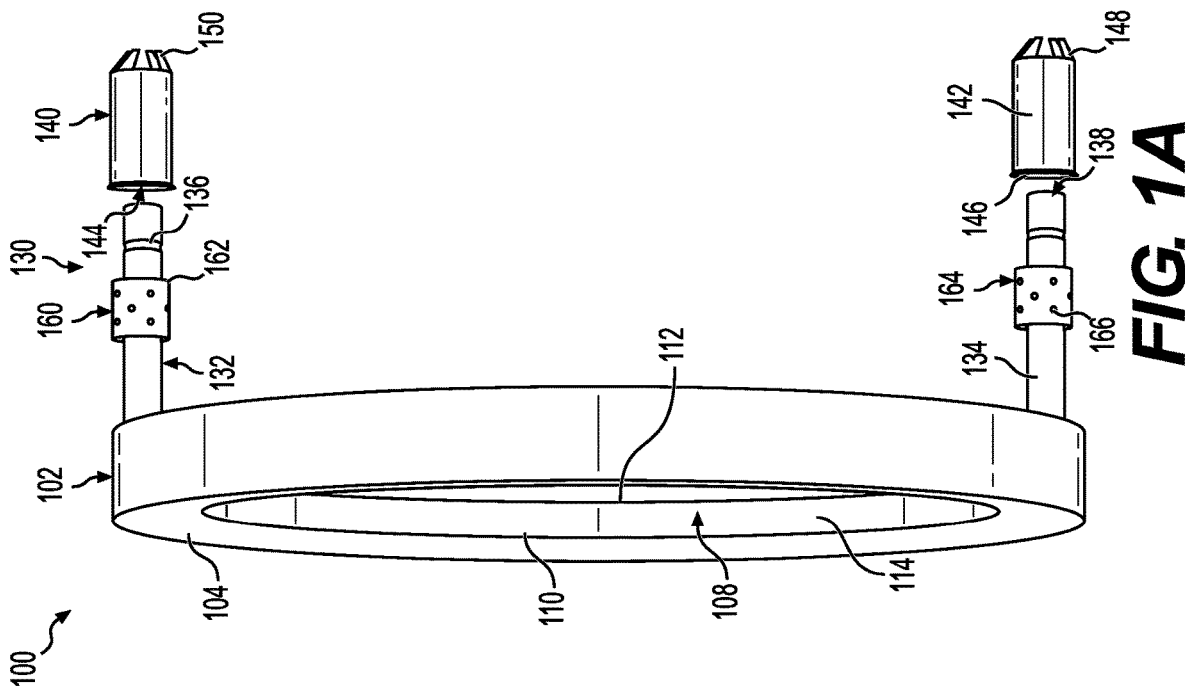

Referring now to FIGS. 1A and 1B, using multiple ball, linear, or similar rolling bearing assemblies around the periphery of an actuation ring, or sliding ring assembly 100, allows for little to no binding of the associated clutch/brake mechanism. The scope of the present disclosure covers both recirculating and non-recirculating rolling elements mated with an appropriate shaft and housing for guidance and support. The number of linear guide bearing assemblies can be as few as one, although at least two are preferred for balancing load. As well, multiples of the linear guide bearing assemblies may be desired to accommodate various loading conditions. The axial travel of the disclosed linear guide bearing assemblies can achieve both long and short actuation (engage/disengage) strokes.

As shown in FIG. 1A, an annular sliding ring assembly 100 in accordance with an embodiment of the present disclosure includes an annular sliding ring 102 and a linear ball guide assembly 130 to help ensure smooth axial motion of the annular sliding ring 102 about its longitudinal center axis 101. Annular sliding ring 102 includes a first end face 104 and a second end face 106 that are substantially parallel to each other and define a central bore 108 therethrough. As shown, the central bore 108 is defined by an inner cylindrical surface 114 and defines a first edge 110 and a second edge 112 where the central bore 108 intersects the first end face 104 and the second end face 106, respectively. Note, in alternate embodiments, a central bore 108 is not included. Referring additionally to FIG. 1B, the annular sliding ring includes a pair of blind bores 116 extending inwardly from the second end face 106 thereof, each blind bore 116 being configured to receive a corresponding guide pin 132 of the linear ball guide assembly 130, as discussed below.

Figures 2A, 2B:
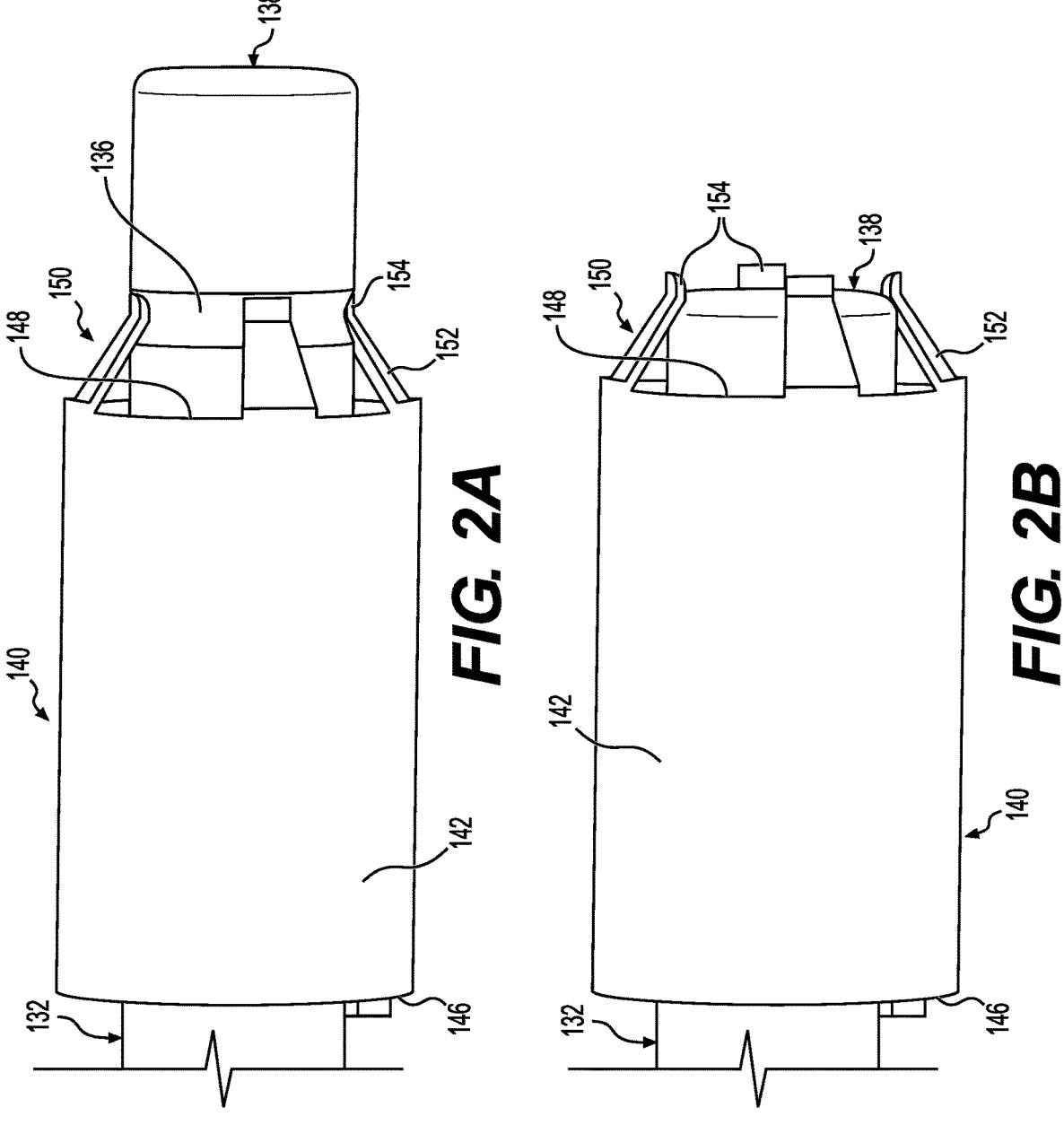
FIGS. 2A and 2B are side views of a position holding feature of the linear bearings shown in the embodiment of FIGS. 1A and 1B.

Preferably, each sliding ring assembly 100 includes at least a pair of linear ball guides assemblies 130 that are equally spaced about the second end face 106 of the annular sliding ring 102. Although a single linear ball guide assembly 130 may be used, the use of multiple linear ball guide assemblies 130 helps insure a more even distribution of force about the annular sliding ring 102 and, therefore, reduced tipping of the annular sliding ring 102 and lower operational friction forces. Preferably, each linear ball guide assembly 130 includes a guide pin 132 having a base portion that is received in a corresponding blind bore 116 of the annular sliding ring 102, a detent housing 140 slidably disposed about a corresponding one of the guide pins 132, and an annular bearing, in the instant case a caged bearing 160, that is slidably disposed within the annular space defined between the guide pin 132 and the corresponding detent housing 140. Each guide pin 132 includes a cylindrical outer surface 134 including an annular groove 136 extending inwardly therefrom, the annular groove being adjacent an end face 138 of the guide pin 132. As best seen in FIGS. 2A and 2B, each detent housing 140 includes a cylindrical body 142 defining a cylindrical bore 144 extending from a first edge 146 of the body to a second edge 148 of the body. One or more spring fingers 150 are disposed about the second edge 148 of the body portion 142 of the detent housing 140, each spring finger 150 including a body 152 extending radially-inwardly therefrom and forming a catch portion 154 on its distal end. Although as few as one spring finger 150 may be utilized, preferably, multiple spring fingers are positioned equally about the second edge 148 to help equalize the distributed forces and maintain alignment, as well as insure a more positive detent engagement.

Figures 3A, 3B:
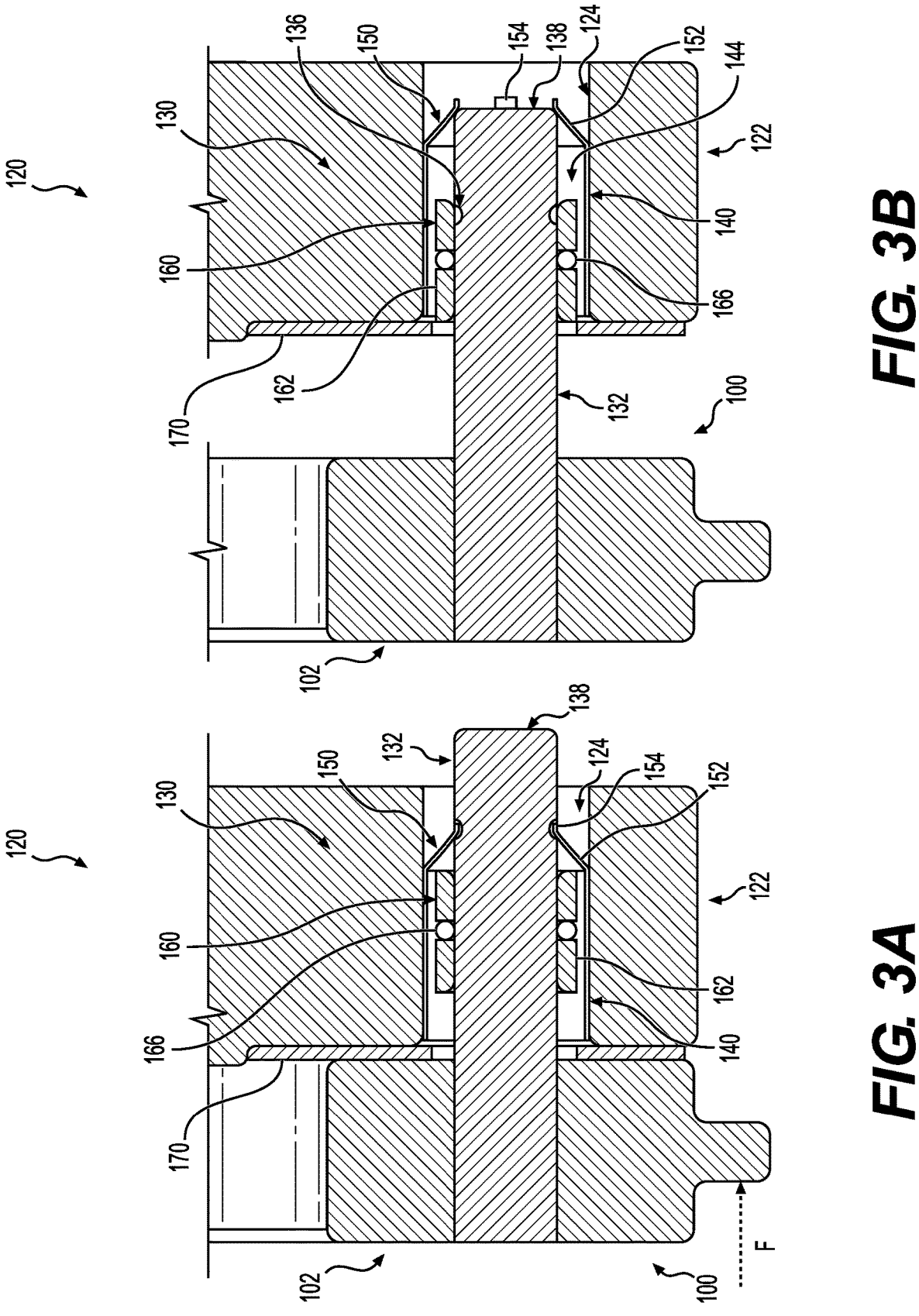
FIGS. 3A and 3B are partial cross-sectional views of a locking clutch assembly including the annular sliding ring and linear bearings as shown in FIGS. 1A and 1B.
Figures 4A, 4B:
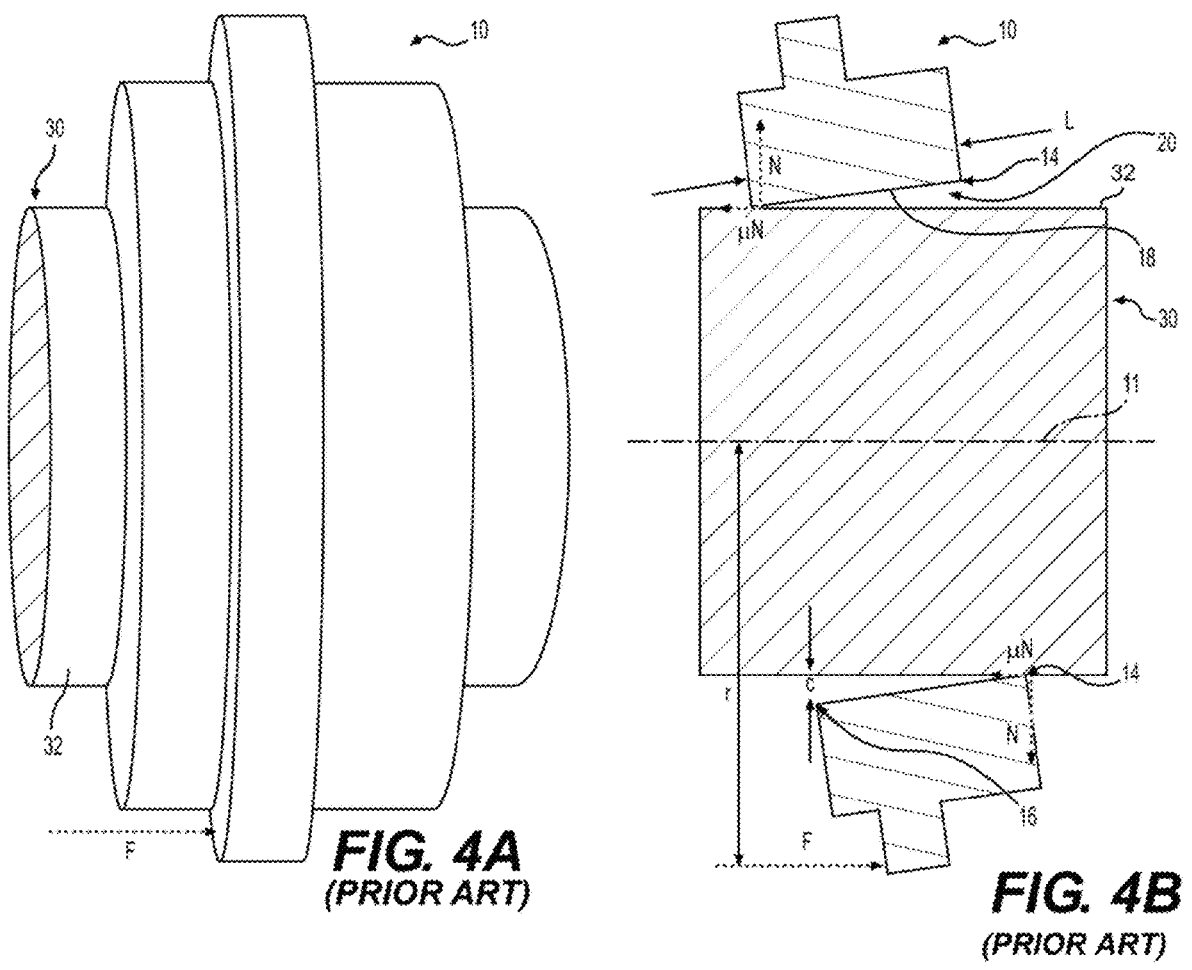
FIGS. 4A and 4B are a perspective view and a cross-sectional view, respectively, of a prior art low-friction locking clutch assembly.

Referring additionally to FIGS. 3A and 3B, as previously noted, the disclosed annular sliding ring assembly 100 includes one or more linear ball guide assemblies 130 and may be utilized in low-friction brake and clutch assemblies 120. As shown, the annular sliding ring assembly 100 is mounted to a housing 122 of the brake or clutch assembly 120 by positioning the detent housing 140 of each linear ball guide assembly 130 within a corresponding bore 124 formed in the housing 122. Preferably, each detent housing 140 is received in the corresponding bore 124 in a press-fit, although alternate methods such as staking, welding, bonding, etc., may be utilized to secure each detent housing 140 within the corresponding bore 124. Next, a caged bearing 160 is disposed about each guide pin 132. As shown, preferably, each caged bearing 160 includes a cylindrical housing 162 defining a plurality of pockets 164, each pocket containing a corresponding roller bearing 166. As previously noted, rollers other than ball rollers may be used in alternate embodiments, as well as alternate embodiments using bushings, etc. Each paired guide pin 132 and caged bearing 160 combination is then inserted into cylindrical bore 144 of a corresponding detent housing 140. A retainer plate 170 is used to maintain both the detent housing 140 and caged bearing 160 within a corresponding bore 124 of the housing 122, yet allow each guide pin 132 to freely move axially within the corresponding bore 124. As shown in FIG. 3A, engagement of the catch portions 154 of the spring fingers

150 within the annular groove 136 of each guide pin 132 retains the annular sliding ring assembly 100 in position until enough force is applied to the left to cause the catch portions 154 to be cammed radially-outwardly. (For the sake of clarity, the guide pins 132 are shown in this case seated in bores extending through ring 102 rather than blind bores.) Continued applications of force to the left causes the guide pins 132 and, therefore, annular sliding ring 102 to move to the left. Similarly, as shown in FIG. 3B for those embodiments where the length of the guide pins 132 is such that the catch portions 154 depend inwardly of the outer diameter of the end face 138, motion of the annular sliding ring assembly 100 to the right is prevented until the amount of force is great enough to cause the distal end of each guide pin 132 to cam the catch portions 154 of the spring fingers 150 radially outwardly. Continued application of force to the right raises the annular sliding ring 102 to move to the right.

The disclosed configuration can be packaged in a short linear space by eliminating the requirement for a support hub and minimizing the length (L) of the annular sliding ring, thus creating a compact actuation system. As well, the disclosed configuration is debris tolerant as a support hub is not required, thereby providing consistent, reliable function over the life of the mechanism. The disclosed configuration also provides high over-turning moment stiffness due to being a low-compliance rolling system. This aspect is desirable since it maintains minimal tipping, thereby providing precise alignment and actuation of clutch/brake mating components.

While one or more preferred embodiments of the invention are described above, it should be appreciated by those skilled in the art that various modifications and variations can be made in the present invention without departing from the scope and spirit thereof.

The invention claimed is:

1. A sliding ring assembly for use in a locking clutch assembly having a housing, comprising:
- a sliding ring having a first end face, a second end face, a central bore extending therethrough from the first end face to the second end face and defining a first edge and a second edge at the intersection of the central bore and the first end face and the second end face, respectively;
- a linear ball guide assembly including at least a first linear ball guide comprising:
  - an elongated guide pin affixed to the sliding ring, the guide pin including a first end and a second end and having an outer surface extending from the second end face of the sliding ring to the second end of the guide pin, the outer surface defining an annular groove extending inwardly therefrom;
  - a detent housing including a body portion having a first end and a second end, a central bore extending therethrough, and a catch portion, the guide pin extending through the central bore of the detent housing so that the bore of the detent housing and the outer surface of the guide pin defines an annular space therebetween,
  - an annular bearing assembly disposed in the annular space defined between the guide pin and the detent housing,
  - wherein the catch portion is selectively engageable with the annular groove.

2. The sliding ring assembly of claim 1, wherein the central bore of the sliding ring is cylindrical.

3. The sliding ring assembly of claim 2, wherein the detent housing further comprises at least one spring finger including a body having a base portion affixed to the body portion and a distal portion defining the catch portion.

4. The sliding ring assembly of claim 3, wherein the at least one spring finger further comprises a plurality of spring fingers that are uniformly spaced about the second end of the detent housing.

5. The sliding ring assembly of claim 4, wherein each spring finger is pivotable between a first position in which the catch portions contact the outer surface of the corresponding guide pin and a second position in which the catch portions engage the annular groove of the corresponding guide pin.

6. The sliding ring assembly of claim 4, wherein the annular bearing assembly further comprises a cylindrical cage defining a plurality of roller pockets, and a plurality of rollers, each roller of the plurality of rollers being rotatably disposed in a corresponding pocket of the plurality of pockets.

7. The sliding ring assembly of claim 6, wherein each roller of the plurality of rollers is a ball roller.

8. The sliding ring assembly of claim 1, wherein the detent housing is affixed to the housing of the locking clutch assembly.

9. The sliding ring assembly of claim 8, wherein the housing of the locking clutch assembly defines a bore, and the detent housing is received in the bore.

10. A sliding assembly for use in a locking clutch assembly having a housing, comprising:
- a body portion having a first end face and a second end face;
- a linear ball guide assembly including at least a first linear ball guide comprising:
  - an elongated guide pin affixed to the body portion, the guide pin including a first end and a second end and having an outer surface extending from the second end face of the body portion to the second end of the guide pin;
  - a detent housing including a body portion having a first end, a second end, and a central bore extending therethrough, the guide pin extending through the central bore of the detent housing so that the bore of the detent housing and the outer surface of the guide pin define an annular space therebetween, and
  - an annular bearing assembly disposed in the annular space defined between the guide pin and the detent housing.

11. The sliding assembly of claim 10, wherein the annular bearing assembly further comprises an annular cage defining a plurality of roller pockets, and a roller disposed in each roller pocket.

12. The sliding assembly of claim 11, wherein each roller is a ball roller.

13. The sliding assembly of claim 10, the elongated guide pin further comprising an outer surface defining an annular groove extending inwardly therefrom, and the detent housing further comprising a catch portion, wherein the catch portion is selectively engageable with the annular groove.

14. The sliding assembly of claim 13, wherein the detent housing further comprises at least one spring finger including a body having a base portion affixed to the body portion and a distal portion defining the catch portion.

15. The sliding assembly of claim 14, wherein the at least one spring finger further comprises a plurality of spring fingers that are uniformly spaced about the second end of the detent housing.

16. The sliding assembly of claim 15, wherein each spring finger is pivotable between a first position in which the catch portions contact the outer surface of the corresponding guide pin and a second position in which the catch portions engage the annular groove of the corresponding guide pin.

17. The sliding assembly of claim 10, wherein the detent housing is affixed to the housing of the locking clutch assembly.

18. The sliding assembly of claim 17, wherein the housing of the locking clutch assembly defines a bore, and the detent housing is received in the bore.

* * * * *